United States Patent
Brenner et al.

(10) Patent No.: US 10,243,180 B2
(45) Date of Patent: Mar. 26, 2019

(54) ACCUMULATOR ARRANGEMENT AND METHOD FOR PRODUCING SAME

(71) Applicant: Johnson Controls Advanced Power Solutions GMBH, Hannover (DE)

(72) Inventors: Helge Brenner, Hannover (DE); Bernhard Ehrlich, Neustadt am Rübenberge (DE); Ralf Joswig, Buchholz (DE)

(73) Assignee: Johnson Controls Advanced Power Solutions GMBH, Hannover (DE)

( * ) Notice: Subject to any disclaimer, the term of this patent is extended or adjusted under 35 U.S.C. 154(b) by 0 days.

(21) Appl. No.: 15/035,726

(22) PCT Filed: Oct. 30, 2014

(86) PCT No.: PCT/EP2014/073288
§ 371 (c)(1),
(2) Date: May 10, 2016

(87) PCT Pub. No.: WO2015/074847
PCT Pub. Date: May 28, 2015

(65) Prior Publication Data
US 2016/0293913 A1    Oct. 6, 2016

(30) Foreign Application Priority Data

Nov. 19, 2013 (DE) .......... 10 2013 112 753

(51) Int. Cl.
*H01M 2/10* (2006.01)
*H01M 10/04* (2006.01)
(Continued)

(52) U.S. Cl.
CPC ......... *H01M 2/1077* (2013.01); *H01M 2/024* (2013.01); *H01M 2/12* (2013.01);
(Continued)

(58) Field of Classification Search
None
See application file for complete search history.

(56) References Cited

U.S. PATENT DOCUMENTS 2,812,376 A    11/1957  Yardney
4,331,848 A *   5/1982  Schneider, Jr. ...... H01H 35/146
                                                    200/61.45 R
(Continued)

FOREIGN PATENT DOCUMENTS

DE    102010012930    9/2011
WO    2013120770      8/2013

OTHER PUBLICATIONS

Bernd et al. (DE 102010012930) (a raw machine translation) (Abstract, Detailed Description & Drawings) (Sep. 29, 2011).*
(Continued)

*Primary Examiner* — Carmen V Lyles-Irving
(74) *Attorney, Agent, or Firm* — Fletcher Yoder P.C.

(57) ABSTRACT

The invention relates to an accumulator arrangement comprising a plurality of individual cells, each in the form of electrochemical accumulator cells and each having a prismatic-shaped housing, wherein the individual cells are arranged one behind the other in at least one row and disposed in a housing or a frame so as to be held together to form an accumulator block, characterized in that
a) one, several or all of the individual cells are formed as an accumulator cell which changes thickness as a function of the respective state of charge,
b) at least one elastically deformable compensating component is arranged at least at one end of the series arrangement of individual cells between the last individual cell and the housing or frame which is designed to accommodate and compensate for the changes in thickness of individual cells occurring as a result of changes in the
(Continued)

state of charge and the thereby resulting changes in the length of the series arrangement.

The invention further relates to a method for producing such an accumulator arrangement.

13 Claims, 5 Drawing Sheets

(51) Int. Cl.
    *H01M 10/0525*     (2010.01)
    *H01M 2/02*     (2006.01)
    *H01M 2/12*     (2006.01)
    *H01M 10/058*     (2010.01)

(52) U.S. Cl.
    CPC ... *H01M 10/0413* (2013.01); *H01M 10/0481* (2013.01); *H01M 10/058* (2013.01); *H01M 10/0525* (2013.01); *H01M 2/0217* (2013.01); *H01M 2220/20* (2013.01); *Y02T 10/7011* (2013.01)

(56) References Cited

U.S. PATENT DOCUMENTS

| | | | |
|---|---|---|---|
| 9,774,020 B2 | 9/2017 | Fuhr et al. | |
| 2003/0017387 A1* | 1/2003 | Marukawa | H01M 2/1077 429/156 |
| 2003/0232233 A1* | 12/2003 | Andrews | H01M 8/241 429/460 |
| 2005/0277884 A1* | 12/2005 | Kriesel | A61M 5/148 604/132 |
| 2008/0226466 A1* | 9/2008 | Eysymontt | F04B 43/113 417/53 |
| 2010/0262188 A1* | 10/2010 | Rabiner | A61B 17/7004 606/249 |
| 2013/0202949 A1 | 8/2013 | Bremer et al. | |
| 2015/0017502 A1* | 1/2015 | Brenner | F16L 33/005 429/99 |

OTHER PUBLICATIONS

PCT/EP2014/073288 International Search Report and Written Opinion dated Dec. 16, 2014.

* cited by examiner

Fig. 4

ACCUMULATOR ARRANGEMENT AND METHOD FOR PRODUCING SAME

The invention relates to an accumulator arrangement comprising a plurality of individual cells in accordance with the preamble of claim 1. The invention further relates to a method for producing such an accumulator arrangement in accordance with claim 13.

Accumulator arrangements in accordance with the preamble of claim 1 are known for example from WO 2012/135758 A1 and WO 2013/120770 A1, Accumulator arrangements of this type having prismatic-shaped individual cells are used for example in electric and hybrid vehicles. The plurality of individual cells is thereby held together by a housing or a frame to form a compact accumulator block. Despite already highly advanced and developed accumulator technology, general acceptance of electric and hybrid vehicles in the market has been relatively slow.

The invention addresses the task of specifying an improved accumulator arrangement which is further optimized in terms of weight, costs and functionality. A method for producing such an accumulator arrangement is further to be specified.

The task is solved according to claim 1 by an accumulator arrangement comprising a plurality of individual cells, each in the form of electrochemical accumulator cells and each having a prismatic-shaped housing, wherein the individual cells are arranged one behind the other in at least one row and disposed in a housing or a frame so as to be held together to form an accumulator block, characterized in that
a) one, several or all of the individual cells are formed as an accumulator cell which changes thickness as a function of the respective state of charge,
b) at least one elastically deformable compensating component is arranged at least at one end of the series arrangement of individual cells between the last individual cell and the housing or frame which is designed to accommodate and compensate for the changes in thickness of individual cells occurring as a result of changes in the state of charge and the thereby resulting changes in the length of the series arrangement.

The invention has the advantage of now being able to use highly optimized individual cells as accumulator cells, ones able to reversibly change thickness as a function of their respective state of charge. Hence, the thickness of an individual cell can increase with increasing state of charge (SOC) and then decrease again with the individual cell's decreasing state of charge. Individual cells configured with relatively lightweight, thin-walled individual cell housings can thus be used to form the accumulator arrangement, which has an advantageous effect in terms of the accumulator arrangement's weight and manufacturing costs. The invention thus enables "breathing" individual cells, so to speak, to be used in the accumulator arrangement without subjecting them to a increased risk of damage. It is hereto provided for the change in thickness of the individual cell and/or individual cells and the resultant changes in the length of the series arrangement of individual cells to be accommodated and compensated for by at least one elastically deformable compensating component, its elastic properties ensuring that the series arrangement of individual cells can be mechanically fixed securely in the housing or frame in each state of charge and always at a certain pretensioning. The individual cells are thus securely and reliably fixed in the housing or the frame and can yet still realize the necessary compensatory movements in consequence of individual cell thickness change. This type of fixing allows the individual cells to better withstand the vibration loads which occur.

Provided the accumulator arrangement has a housing for accommodating the individual cells, the housing protects the individual cells completely or at least for the most part against external environmental influences. The housing 10 can encapsulate as it were the individual cells. Provided the accumulator arrangement has a frame for accommodating the individual cells, the individual cells are likewise fixed securely and held together to form a compact accumulator block as in the case of a housing, but are less protected against external environmental influences.

The prismatic housing can in particular be a rectangular or at least approximate rectangular housing. The individual cells are disposed successively in a row, e.g. by their respective largest housing side in terms of surface area.

The series arrangement of the individual cells can be supported either directly on the housing or frame or on another component, particularly on at least one pretensioning element to be described in greater detail below, at the other end of the series arrangement opposite the end with the compensating component. The accumulator arrangement can comprises just one single compensating component or a plurality of compensating components arranged next to each other (parallel) or one after the other (as in a row). In particular, the compensating component can be configured as a pressure-loaded elastic component with or without damping properties. The compensating component can be made for example of foam, silicone or rubber material or a combination of different materials of such type. In particular, the compensating component can be made from a material having both elastic as well as damping properties at the same time.

According to one advantageous further development of the invention, the compensating component comprises an arrangement of at least one damping element and at least one compression spring. Doing so enables being able to provide discrete elements for the "suspension" function and for the "damping" function, each able to be separately optimized for the respective application. The compression spring can be made for example of metal, e.g. as a spiral spring, barrel spring, conical spring, disk spring or the like. The damping element can be e.g. a hydraulic damper.

According to one advantageous further development of the invention, the at least one compensating component is designed to compensate changes of at least 10 mm in length of the series arrangement of individual cells resulting from the changes in thickness occurring in consequence of changes in the state of charge. This allows the use of individual cells with relatively high thickness change deviation.

Change in individual cell thickness refers to a spatial change in the individual cell's geometrical dimension extending in the longitudinal direction of the series arrangement of the plurality of individual cells.

According to one advantageous further development of the invention, at least one pretensioning element is arranged at east at one end of the series arrangement of individual cells between the last individual cell and the housing or the frame, which braces said last individual cell against the housing or frame. The at least one pretensioning element enables the series arrangement of individual cells to be pretensioned at an adjustable pretensioning force vis-à-vis the at least one compensating component. The pretensioning force can be arbitrarily adjusted to a predetermined value particularly during the production of the accumulator arrangement. This has the advantage of a defined pretensioning force being able to be exerted on the series arrangement of individual cells which in particular conforms to the specified maximum load for the individual cells. Doing so thus enables the individual cells to be securely fixed in the housing or frame without the pretensioning force causing damage to the individual cells.

According to one advantageous further development of the invention, at least one pretensioning element is arranged at least at one end of the series arrangement of individual cells between the last individual cell and the housing or the frame, bracing said last individual cell against the housing or frame. The at least one pretensioning element is designed to be arbitrarily controllable in terms of adjustable length at least in the direction of the longitudinal extension of the series arrangement of individual cells. The arbitrary control thus enables a regulating of the longitudinal extension of the pretensioning element in the direction of the longitudinal extension of the series arrangement of individual cells. This allows being able to compensate for manufacturing tolerances in the dimensions of the individual cells, the housing or the frame as well as the play associated therewith. A further advantage is being able to simplify the assembling of individual cells within the housing or frame during the production of the accumulator arrangement. Hence, the compensating component, the individual cells and the pretensioning element can be loosely arranged and with some degree of play in the housing or frame and the pretensioning element then expanded in the direction of the longitudinal extension of the series arrangement until the play is compensated and the individual cells are fixed.

According to one advantageous further development of the invention, the at least one compensating component, or in the case of a plurality of compensating components, at least one of said compensating components, is designed as the at least one pretensioning element. In this case, the compensating component assumes as it were the function of the pretensioning element at the same time.

The compensating component and/or the pretensioning element can be formed for example in the shape of a pouch, a bag or a tube of flexible material, e.g. a plastic foil material. This allows the compensating component and/or pretensioning element to be filled with a fill medium and thereby selectively exhibit suspension, damping and/or length-variation functions. The compensating component can also be designed as a deep-drawn or blow-molded part.

According to one advantageous further development of the invention, the at least one pretensioning element is arranged at the other end of the series arrangement of individual cells opposite the side of the at least one compensating component between the last individual cell and the housing or frame. In so doing, at least one discrete pretensioning element is provided separate from the compensating component which can, as mentioned, be pretensioned with an adjustable pretensioning force and/or be adjustable in length in the direction of the longitudinal extension of the series arrangement of individual cells.

According to one advantageous further development of the invention, the at least pretensioning element has an inner cavity able to be filled with at least one fill material, wherein the fill material is kept in the inner cavity by an outer wall of the least one pretensioning element. To this end, the at least one pretensioning element can comprise for example a fill opening for the fill material and/or a vent opening for the ventilation of gases contained in the inner cavity. Where appropriate, the fill opening can also be used simultaneously as a vent opening.

According to one advantageous further development of the invention, the cavity of the at least one pretensioning element is filled with a hardening fill material. Epoxy resin, polyurethane foam, silicone or rubber can for example be used for this purpose. The term "hardening" hereby refers to a change in the state of the fill material to the effect of the hardness of the fill material increasing during a curing process, wherein the fill material can also be elastically deformable and flexible, respectively relatively soft, subsequent hardening. In particular, the fill material can be selected so as to still exhibit such elastic and/or damping properties even after hardening as to be suited to forming the compensating component.

According to one advantageous further development of the invention, one, several or all of the individual cells are designed as lithium-ion cells. This has the advantage of the individual cells being able to be formed using an accumulator technology which combines high capacity at minimal space with good electrical properties. The at least one elastically deformable compensating component according to the invention can accommodate and compensate for the changes in thickness occurring with such cells.

The task cited at the outset is further solved according to claim 13 by a method for producing an accumulator arrangement comprising the steps of:
a) providing an accumulator arrangement according to one of claim 5 or 6,
b) arbitrarily loading the at least one pretensioning element for generating or increasing the pretensioning force exerted on the series arrangement of the individual cells by the at least one pretensioning element,
c) ceasing the loading of the at least one pretensioning element upon reaching a predetermined pretensioning force value.

This has the advantage of being able to simply and quickly produce the accumulator arrangement. In particular, no problems arise during production such as for example the pretensioning force damaging the cells because the individual cells are not set to the desired value until after they have been inserted into the housing or frame. This type of tensioning method can produce a defined pretensioning force, thus enabling a more reliably validated final product.

According to one advantageous further development of the invention, the following step is performed between steps a) and b) of the above-cited method: arbitrarily loading the at least one pretensioning element to overcome play of the arrangement.

The following will reference the drawings in describing the invention in greater detail by way of example embodiments.

Shown are.

The figures make use of the same reference numerals for equivalent elements.

Figure 1:
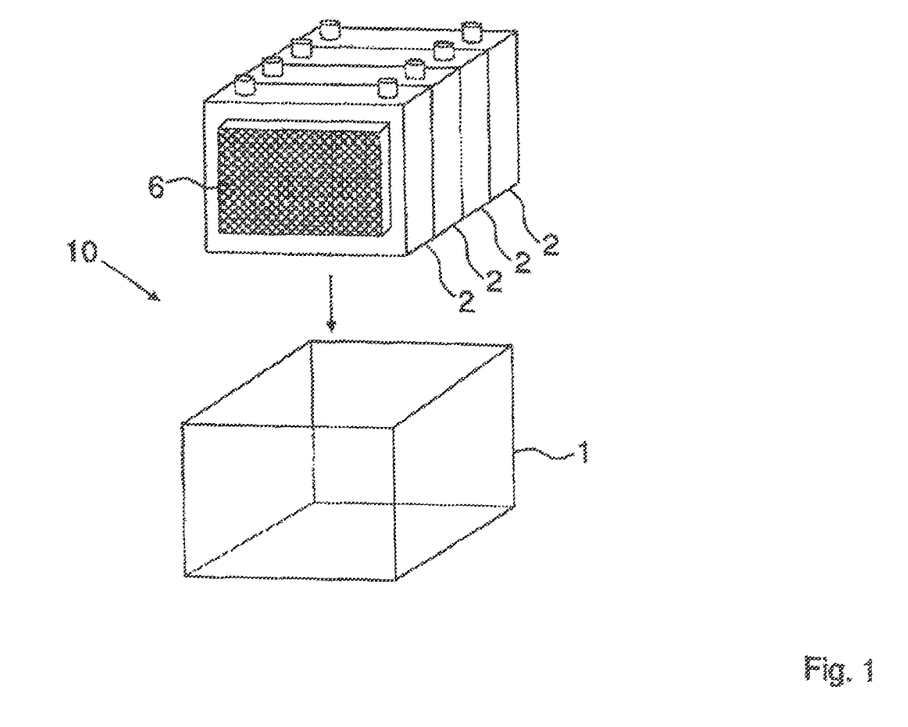
FIG. 1 an isometric view of the components of an accumulator arrangement.
Figure 2:
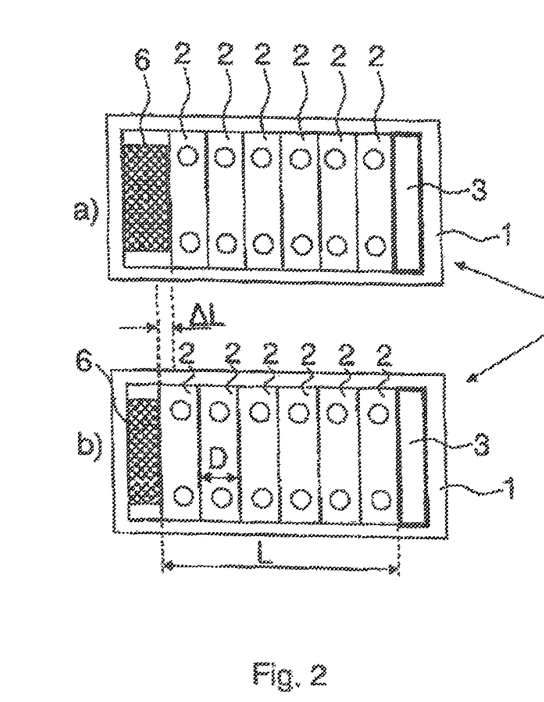
FIG. 2 a top view of an accumulator arrangement.

FIG. 1 shows a housing 1, into which a plurality of individual cells 2 of substantially rectangular housing are to be inserted as represented by the arrow so as to thereby form an accumulator arrangement 10. The individual cells 2 are arranged one behind the other in a row; FIG. 1 shows the example of four individual cells. Of course greater and fewer numbers of cells are likewise possible. Further to be seen in FIG. 1 is an elastically deformable compensating component 6 disposed on the last individual cell 2 at one end of the series arrangement of the individual cells. The compensating component 6 braces the last individual cell 2 against the housing 1 and thereby fixes the entire series arrangement of individual cells 2 in the housing 1. In the process, the compensating component 6 additionally accommodates and compensates for changes in length of the series arrangement occurring as a result of thickness changes in individual cells 2. This is depicted in greater detail in FIG. 2. FIG. 2 shows an accumulator arrangement pursuant to FIG. 1 in views a) and b), however here with six individual cells 2 arranged in series one behind the other. As can be recognized, the individual cells 2 are supported on a wall of the housing 1 on the one side of the series arrangement by the compensating component 6 and on the other side by a pretensioning element 3. The pretensioning element 3 can also be dispensed with such that the last individual cell 2 is directly supported on the wall of the housing 1 in this case.

In view a), FIG. 2 shows the individual cells 2 in a state of charge in which the individual cells 2 are only minimally charged. In view b), the individual cells 2 have a stronger charge; i.e. a higher state of charge. This results in the thickness of the individual cells 2 increasing and thus in a greater compression of the compensating component 6, as view b) of FIG. 2 shows. The individual cell thickness is indicated by the D dimension as per FIG. 2. The series arrangement of the individual cells 2 thereby has a longitudinal extension of a length L. The change in individual cell thickness results in an overall change in length $\Delta L$ to the series arrangement as shown in FIG. 2.

Figure 3:
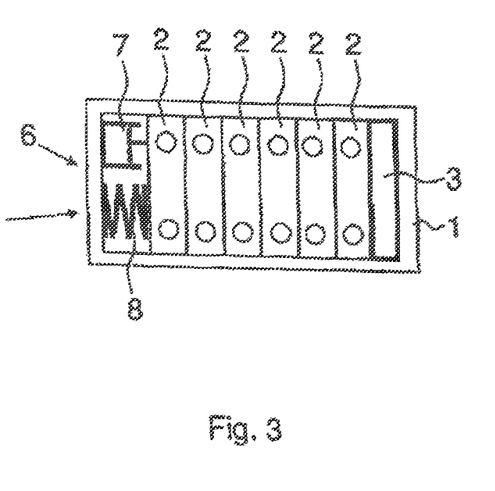
FIG. 3 a top view of a further accumulator arrangement.

The compensating component 6 can be configured as a block of elastically deformable material, e.g., foam or rubber, having internal cavities where appropriate. The compensating component 6 can also be configured as an arrangement of multiple individual components, an example of which is depicted in FIG. 3. In accordance with FIG. 3, the compensating component 6 can comprise an arrangement consisting of a compression spring 8 and a damper 7. The damper 7 and the compression spring 8 then brace the last individual cell 2 against a wall of the housing 1. By providing such separate components for the damping function and the suspension function, as depicted in FIG. 3, a damping constant and a spring constant of the compensating component 6 can be separately optimized to the respective application.

Figure 4:
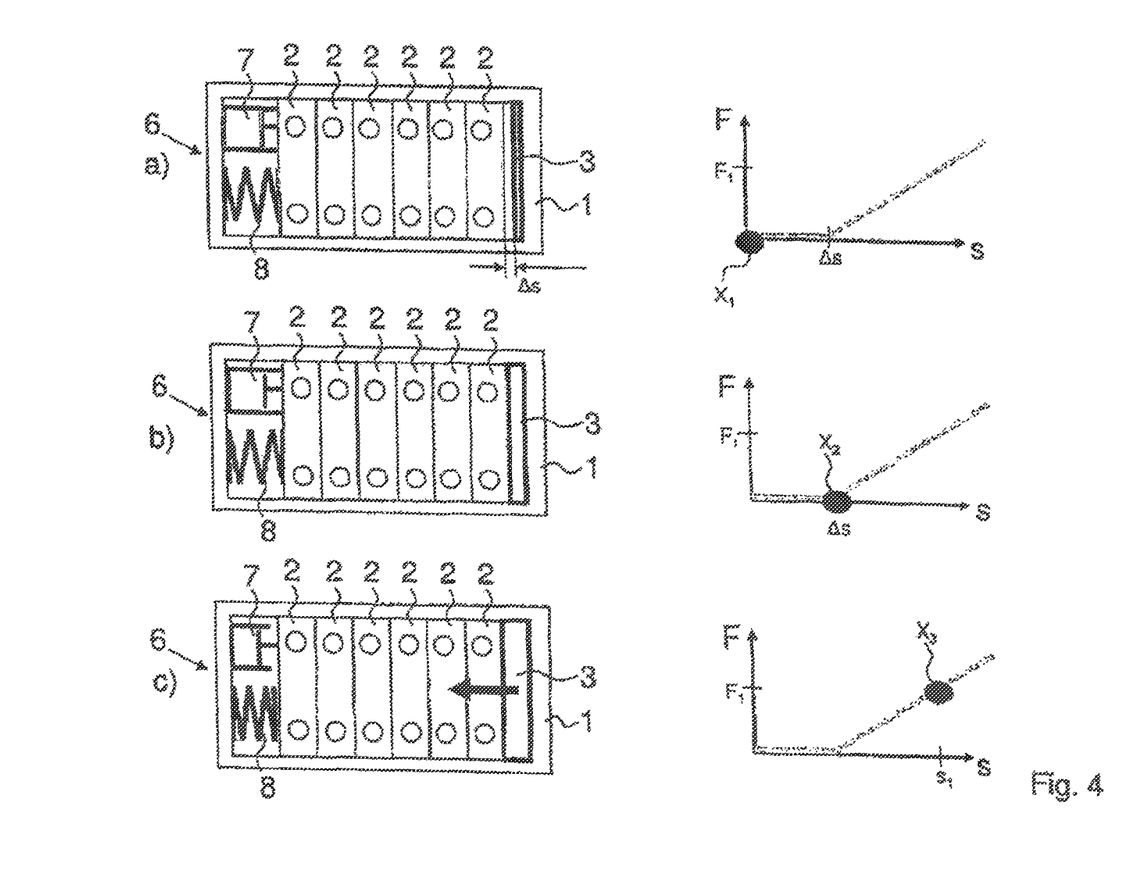
FIG. 4 process steps for an accumulator arrangement.

The following will reference FIG. 4 in describing how the pretensioning element 3 can fix the individual cells 2 in the housing 1 in the accumulator arrangement 10 according to FIG. 3. It is to be assumed in view a) that the individual cells 2 have already been initially inserted into the housing 1, wherein the compensating component 6 is arranged at one end of the series arrangement of the individual cells 2 and the pretensioning element 3 at the other end. The individual cells 2, the compensating component 6 and the pretensioning element 3 are initially arranged relatively loosely in the housing 1 with a certain degree of play $\Delta s$; i.e. the individual cells 2 have not yet been fixed.

In FIG. 4, a force/displacement diagram is depicted to the right of each pictured accumulator arrangement 10 in which the characteristic curve of the force F is plotted over the displacement s. The force F is the force exerted by the pretensioning element 3 on the series arrangement of individual cells 2 which correlates to the corresponding counter-force of the compensating component 6. According to view a), the applied force F equals 0; i.e. the arrangement is at operating point $X_1$. In view b), the pretensioning element 3 has been somewhat extended such that it lies against its associated individual cell 2 and bridges the gap $\Delta s$. A force F>0 has not yet been generated; i.e. the arrangement is at operating point $X_2$.

According to view c), the pretensioning element 3 is now extended further as represented by the arrow in view c). The individual cells 2 are thereby pressed against the compression spring 8 and the damper 7, thereby shortening somewhat. The force F hereby increases. This process is carried out until a desired pretensioning force $F_1$ is reached, which occurs at a displacement point $s_1$ in the diagram depicted in view c). The arrangement is now at operating point $X_3$.

Figure 5:
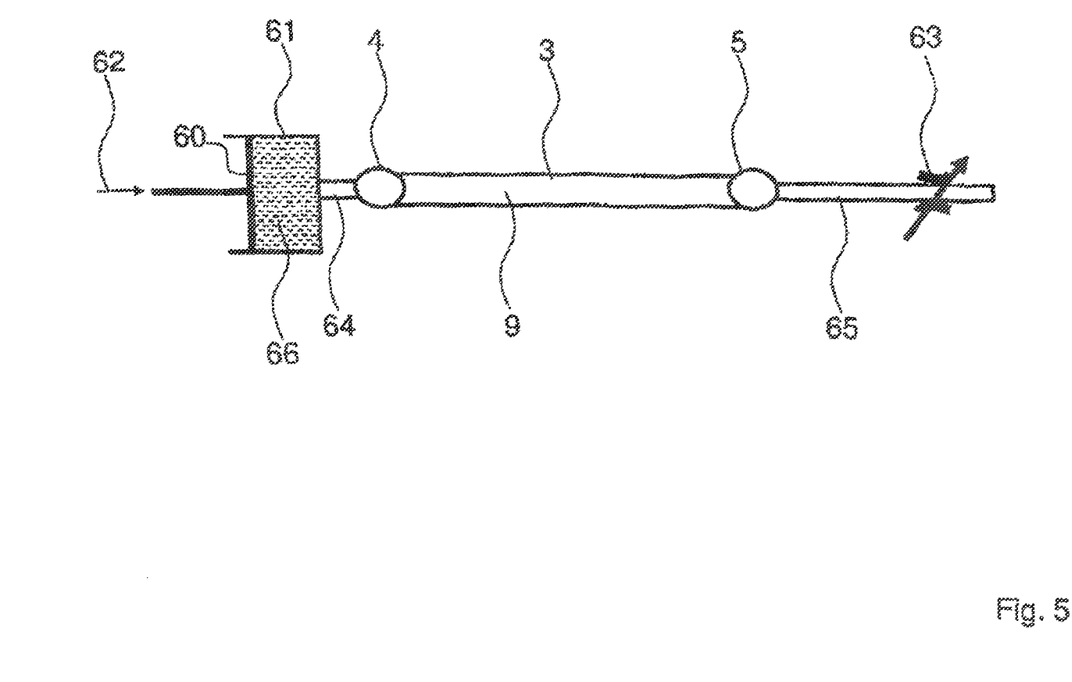
FIG. 5 a pretensioning element.

The length-variable pretensioning element 3 can be designed for example as a flexible component able to be filled with a fill material, e.g. a tube, bag, pouch or blow-molded part. FIG. 5 shows an example of such a pretensioning element 3 in the form of a tube having an arrangement for filling with the fill material. The pretensioning element 3 comprises a fill opening 4 for filling the fill material and a vent opening 5 to ventilate the gases contained in an inner cavity 9 of the pretensioning element 3. A container 61 of the fill material 66 is attached to the fill opening 4 by means of a nozzle 64. The fill material 66 can be pressurized by a plunger 60 and thereby be pressed into the pretensioning element 3 as depicted by arrow 62. In order to vent the gases contained in the pretensioning element 3, the vent opening 5 is connected via a tube 65 to a bleeder valve 63 which can be closed and opened. The tube 65 discharges on the other side of the bleeder valve 63, e.g. into the atmosphere.

Figure 6:
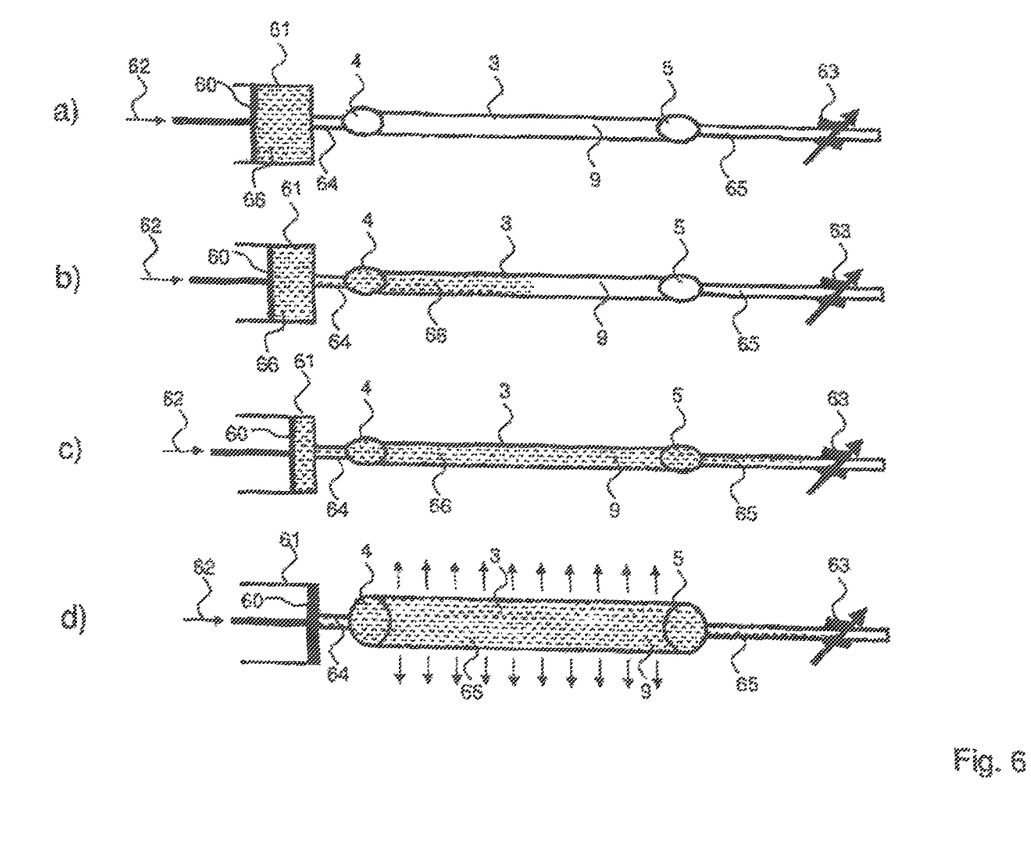
FIG. 6 the steps of filling the pretensioning element according to FIG. 5.

The following will reference FIG. 6 in describing how the arrangement according to FIG. 5 realizes the filling process for the pretensioning element 3. View a) of FIG. 6 in turn first shows the arrangement according to FIG. 5 in which the pretensioning element 3 has not yet been filled with fill material 66. The bleed valve 63 is then opened. Pressure 62 on the plunger 60 causes fill material 66 to be pressed into the pretensioning element 3 as can be seen in view b). View c) shows that the entire pretensioning element 3 has been filled with the fill material 66. The fill material 66 already extends partway into the tube 65. The bleed valve 63 is now closed. In consequence of closing the bleed valve 63, the fill material 66 can no longer exit from the pretensioning element 3. Upon further pressure 62 on plunger 60, as can be seen in view d), the pretensioning element 3 is overpressured as it were by the fill material 66 such that it expands in the direction of the vertical arrows depicted in view d). This expansion corresponds for example to the thickening of the pretensioning element 3 depicted in view c) of FIG. 4.

Once the process according to FIG. 6 is completed, the pretensioning element 3 can be closed off at the fill opening 4 and the vent opening 5 and the remaining components such as the storage container 61 along with the nozzle 64 as well as the tube 65 along with the bleed valve 63 removed.

The invention claimed is:

1. An accumulator arrangement comprising a plurality of individual cells, each in the form of electrochemical accumulator cells and each having a prismatic-shaped housing, wherein the individual cells are arranged one behind the other in at least one row and disposed in a housing or a frame so as to be held together to form an accumulator block, wherein:
one, several or all of the individual cells are formed as an accumulator cell which changes thickness as a function of the respective state of charge, at least one elastically deformable compensating component is arranged at least at one end of the series arrangement of individual cells between the last individual cell and the housing or frame which is designed to accommodate and compensate for the changes in thickness of individual cells occurring as a result of changes in the state of charge and the thereby resulting length changes of the series arrangement; and at least one pretensioning element is arranged at least at one end of the series arrangement of individual cells between the last individual cell and the housing or the frame which braces said last individual cell against the housing or frame, wherein the at least one pretensioning element enables the series arrangement of individual cells to be pretensioned at an adjustable pretensioning force vis-à-vis the housing or the frame, wherein the adjustable pretensioning force is exerted on the plurality of individual cells by the at least one pretensioning element and secures the plurality of individual cells within the housing or frame, wherein the at least one pretensioning element has an inner cavity able to be filled with a fill material to create the adjustable pretensioning force, wherein the at least one pretensioning element is separate from the plurality of individual cells and the housing or frame, and the at least one pretensioning element comprises an outer wall enclosing the inner cavity, wherein the outer wall comprises a flexible material such that the fill material is kept in the inner cavity by the outer wall of the least one pretensioning element when the inner cavity is filled with the fill material, and wherein the inner cavity is filled with a hardening fill material.

2. The accumulator arrangement according to claim 1, wherein the at least one compensating component is configured as a pressure-loaded elastic component with or without damping properties.

3. The accumulator arrangement according to claim 1, wherein the at least one compensating component comprises an arrangement of at least one damping element and at least one compression spring.

4. The accumulator arrangement according to claim 1, wherein the at least one compensating component is designed to compensate length changes of at least 10 mm of the series arrangement of individual cells resulting from the changes in thickness occurring in consequence of changes in the state of charge.

5. The accumulator arrangement according to claim 1, wherein the at least one pretensioning element is arbitrarily controllable in terms of adjustable length at least in the direction of the longitudinal extension of the series arrangement of individual cells.

6. The accumulator arrangement according to claim 1, wherein the at least one compensating component, or in the case of a plurality of compensating components, at least one of said compensating components, is designed as the at least one pretensioning element.

7. The accumulator arrangement according to claim 1, wherein the at least one pretensioning element is arranged at the other end of the series arrangement of individual cells opposite the side of the at least one compensating component between the last individual cell and the housing or frame.

8. The accumulator arrangement according to claim 1, wherein the at least one pretensioning element comprises a fill opening for the fill material and/or a vent opening for the ventilation of gases contained in the inner cavity.

9. The accumulator arrangement according to claim 1, wherein the hardening fill material comprises epoxy resin, polyurethane foam, silicone or rubber.

10. The accumulator arrangement according to claim 1, wherein one, multiple or all of the individual cells are designed as lithium-ion cells.

11. The accumulator arrangement according to claim 1, wherein the at least one pretensioning element comprises a plurality of outer walls enclosing the inner cavity, the plurality of outer walls comprising the outer wall.

12. The accumulator arrangement according to claim 11, wherein the plurality of outer walls of the at least one pretensioning element contacts the housing or frame and the last individual cell.

13. The accumulator arrangement according to claim 1, wherein the outer wall is configured to expand at least in the direction of the longitudinal extension of the series arrangement of individual cells when the inner cavity is filled with the fill material.

* * * * *

UNITED STATES PATENT AND TRADEMARK OFFICE
CERTIFICATE OF CORRECTION

PATENT NO. : 10,243,180 B2
APPLICATION NO. : 15/035726
DATED : March 26, 2019
INVENTOR(S) : Brenner et al.

Page 1 of 1

It is certified that error appears in the above-identified patent and that said Letters Patent is hereby corrected as shown below:

On the Title Page

Item (57), under "ABSTRACT", in Column 1, Line 1, delete "and the thereby" and insert --and thereby--, therefor.

In the Specification

In Column 1, Line 11, delete "A1, Accumulator" and insert --A1. Accumulator--, therefor.

In Column 1, Line 41, delete "and the thereby" and insert --and thereby--, therefor.

In Column 1, Line 56, delete "a increased" and insert --an increased--, therefor.

In Column 2, Line 24, delete "can comprises" and insert --can comprise--, therefor.

In Column 2, Line 59, delete "at east" and insert --at least--, therefor.

In Column 3, Line 62, delete "the least" and insert --the at least--, therefor.

In Column 5, Line 34, delete "e.g., foam" and insert --e.g. foam--, therefor.

In the Claims

In Column 7, Line 7, in Claim 1, delete "and the thereby" and insert --and thereby--, therefor.

In Column 7, Line 29, in Claim 1, delete "the least" and insert --the at least--, therefor.

Signed and Sealed this
Eighteenth Day of June, 2019

Andrei Iancu
*Director of the United States Patent and Trademark Office*